(12) United States Patent
Ziehl (10) Patent No.: US 11,022,561 B2
(45) Date of Patent: Jun. 1, 2021

(54) INTEGRATED AND AUTOMATED VIDEO/STRUCTURAL HEALTH MONITORING SYSTEM

(71) Applicant: UNIVERSITY OF SOUTH CAROLINA, Columbia, SC (US)

(72) Inventor: Paul Ziehl, Irmo, SC (US)

(73) Assignee: University of South Carolina, Columbia, SC (US)

( * ) Notice: Subject to any disclaimer, the term of this patent is extended or adjusted under 35 U.S.C. 154(b) by 0 days.

(21) Appl. No.: 16/594,378

(22) Filed: Oct. 7, 2019

(65) Prior Publication Data

US 2020/0110041 A1    Apr. 9, 2020

Related U.S. Application Data (60) Provisional application No. 62/742,499, filed on Oct. 8, 2018.

(51) Int. Cl.
*G01N 21/88*    (2006.01)
*G01N 29/14*    (2006.01)
(Continued)

(52) U.S. Cl.
CPC ......... *G01N 21/8851* (2013.01); *G01N 29/14* (2013.01); *G06K 9/00637* (2013.01);
(Continued)

(58) Field of Classification Search
USPC .......................................................... 348/143
See application file for complete search history.

(56) References Cited

U.S. PATENT DOCUMENTS 6,237,873 B1    5/2001    Amaoka et al.
6,459,492 B1    10/2002    Hercher
(Continued)

FOREIGN PATENT DOCUMENTS

WO    WO2004/085141    10/2004
WO    WO2015/077262    5/2015
(Continued)

OTHER PUBLICATIONS

Ageorges, et al. "Fusion Bonding of Polymer Composites—Ch. 2: State of the Art in Fusion Bonding of Polymer Composites" *Eng. Mater. Proc. Ser.* (2002) pp. 7-64. (Abstract only).
(Continued)

*Primary Examiner* — Patricia I Young
(74) *Attorney, Agent, or Firm* — Dority & Manning, P.A.

(57) ABSTRACT

Structural health monitoring (SHM)/nondestructive evaluation (NDE) exists as a tool in conjunction with manufactured pieces. Presently disclosed subject matter integrates automated video with a structural health monitoring system. In conjunction with bridge monitoring, integration of such two systems automates determination of the effect or correlation of vehicular loading on SHM data from a subject bridge. Such correlations help to understand the sources of structural health monitoring data, particularly acoustic emission data, in bridges and other structures, such as dams and nuclear plants. Automation of the evaluation of bridges and other structures increases accuracy and minimizes risk to workers and the public. Assessing the structural condition of bridges and other structures as presently disclosed also facilitates automated asset management of transportation systems, such as by state departments of transportation and other bridge/structural owners.

17 Claims, 2 Drawing Sheets

(51) Int. Cl.
*G06K 9/60* (2006.01)
*G10L 25/51* (2013.01)
*H04N 7/18* (2006.01)
*G06K 9/00* (2006.01)

(52) U.S. Cl.
CPC .............. *G10L 25/51* (2013.01); *H04N 7/18* (2013.01); *G01N 2291/0231* (2013.01); *G01N 2291/0232* (2013.01); *G01N 2291/0234* (2013.01); *G01N 2291/0235* (2013.01); *G01N 2291/0238* (2013.01); *G01N 2291/0289* (2013.01)

(56) References Cited

U.S. PATENT DOCUMENTS

| | | |
|---|---|---|
| 6,713,743 B2 | 3/2004 | Kim et al. |
| 6,875,501 B2 | 4/2005 | Labordus et al. |
| 6,942,830 B2 | 9/2005 | Mülhaupt et al. |
| 6,996,480 B2 | 2/2006 | Giurgiutiu et al. |
| 7,024,315 B2 | 4/2006 | Giurgiutiu |
| 7,026,014 B2 | 4/2006 | Luzinov et al. |
| 7,126,096 B1 | 10/2006 | Matsen et al. |
| 7,174,255 B2 | 2/2007 | Giurgiutiu et al. |
| 7,261,938 B2 | 8/2007 | Luzinov et al. |
| 7,665,363 B2* | 2/2010 | Capilla ............... G01N 29/265 73/627 |
| 7,881,881 B2 | 2/2011 | Giurgiutiu et al. |
| 7,985,451 B2 | 7/2011 | Luzinov et al. |
| 8,389,114 B2 | 3/2013 | Luzinov et al. |
| 8,483,977 B1* | 7/2013 | Johnnie ................. G01N 29/46 702/36 |
| 9,158,054 B2 | 10/2015 | Giurgiutiu et al. |
| 9,211,674 B2 | 12/2015 | Van Tooren |
| 9,581,570 B2 | 2/2017 | Caicedo et al. |
| 2004/0053027 A1 | 3/2004 | Labordus et al. |
| 2004/0151921 A1 | 5/2004 | Labordus et al. |
| 2006/0265146 A1* | 11/2006 | Gorinevsky ....... G05B 23/0221 702/39 |
| 2008/0288184 A1 | 11/2008 | Giurgiutiu et al. |
| 2009/0014919 A1 | 1/2009 | Rossfeldt et al. |
| 2009/0048789 A1 | 2/2009 | Yu et al. |
| 2010/0132469 A1 | 6/2010 | Giurgiutiu et al. |
| 2010/0291304 A1 | 11/2010 | Becker |
| 2011/0185790 A1* | 8/2011 | Choi ........................ G01M 3/04 73/40 |
| 2011/0259128 A1 | 10/2011 | Ziehl et al. |
| 2012/0280414 A1 | 11/2012 | Giurgiutiu et al. |
| 2014/0082775 A1 | 3/2014 | Zahl |
| 2014/0220356 A1 | 8/2014 | Van Tooren |
| 2014/0291886 A1 | 10/2014 | Mark et al. |
| 2015/0108677 A1 | 4/2015 | Mark et al. |
| 2015/0338380 A1 | 11/2015 | Ziehl et al. |
| 2016/0171309 A1* | 6/2016 | Hay ........................ G01N 29/44 348/143 |
| 2017/0044337 A1 | 2/2017 | Van Tooren et al. |
| 2017/0057167 A1 | 3/2017 | Van Tooren et al. |
| 2017/0168021 A1 | 6/2017 | Van Tooren et al. |
| 2017/0341301 A1 | 11/2017 | Van Tooren et al. |
| 2018/0063895 A1 | 3/2018 | Van Tooren et al. |

FOREIGN PATENT DOCUMENTS

| | | |
|---|---|---|
| WO | WO2015/112998 | 7/2015 |
| WO | WO2017/035313 | 3/2017 |
| WO | WO2017/210504 | 12/2017 |

OTHER PUBLICATIONS

Anay, et al. "On-Site Acoustic Emission Monitoring for Assessment of a Prestressed Concrete Double-Tee Beam Bridge without Plans" *J. Perf. Constr. Fac.* 30(4):04015062 (2017) pp.

Anderson, et al. "Ultrasonic radiation from wedges of cubic profile: Experimental results" *Ultrasonics* 63 (2015) pp. 141-146.

Appalla, et al., "Assessing Corrosion Damage in Post-Tensioned Concrete Structures Using Acoustic Emission" (2016) *J. Mater. Civil Eng.* 28(2):04015128 (2016) pp. 1-10.

Appalla, A. "Assessing Corrosion Damage in Post-Tensioned Concrete Structures Using Acoustic Emission & a Preliminary Investigation of Biopolymer Doped Cement Mortar for Use in Structural Restoration" *U. South Carolina* (2013) pp. 1-85.

ASME. "Boiler and Pressure Vessel Code—Section X: Fiber-Reinforced Pressure Vessels" *ASME Int'l.* BPVC-X-2015 (2015) pp. 1-290. (Abstract only).

Assouli, et al. "Detection and identification of concrete cracking during corrosion of reinforced concrete by acoustic emission coupled to the electrochemical techniques" *NDT&E Int'l.* 38(8) (2005) pp. 682-689.

Austin, et al. "Piezoelectric Sensing for Detecting and Characterizing Damage in Realistic CFRP Components" *Proc. IEEE Int'l Conf. Progn. Health Mgmt.* (2015).

Austin, et al. "Damage Evaluation for Aircraft CFRP Components Using Piezoelectric Sensing" *Struct. Health Monit.* (2015) (Abstract only).

Austin, et al. "Acoustic Emission for Damage Evaluation in Realistic CFRP Components" *ASNT Ann. Conf.* (2014) (Abstract only).

Austin, et al. "Damage Evaluation for High Temperature CFRP Components Using Acoustic Emission Monitoring" *AIP Conf. Proc.* 1581 (2014) pp. 501-505.

Austin, et al. "High Temperature Health Monitoring of Organic Matrix Composites for Aircraft Engine Applications" *Proc. 8th Int'l Workshop Struct. Health Monit.* (2011).

Azbaid El Ouahabi, et al. "Experimental investigation of the acoustic black hole for sound absorption in air" *ICSV22* (2015) pp. 1-8.

Azbaid El Ouahabi, et al. "Investigation of the acoustic black hole termination for sound waves propagating in cylindrical waveguides" *44th Int'l Cong. Expo. Noise Contr. Eng.* (2015) pp. 1-10.

Bowyer, et al. "Damping of flexural vibrations in composite plates and panels containing one- and two-dimensional acoustic black holes" *Proc. Acoustics* (2012) pp. 2199-2204.

Bowyer, et al. "Experimental study of damping flexural vibrations in tapered turbofan blades" *Proc. Acoustics* (2012) pp. 2207-2212.

Bowyer, et al. "Damping of flexural vibrations in rectangular plates by slots of power-law profile" *Proc. Acoustics* (2012) pp. 2193-2198.

Bowyer, et al. "Damping of flexural vibrations in glass fibre composite plates and honeycomb sandwich panels containing indentations of power-law profile" *Proc. Meet. Acoustics* 18(1) (2012) pp. 1-13.

Bowyer, et al. "Sound radiation of rectangular plates containing tapered indentations of power-law profile" *Proc. Meet. Acoustics* 18(1) (2012) p. 1-13.

Bowyer, et al. "Effect of geometrical and material imperfections on damping flexural vibrations in plates with attached wedges of power law profile" *Appl. Acoust.* 73(5) (2012) pp. 514-523.

Bowyer, et al. "Experimental Investigations into the Acoustic Black Hole Effect and its Applications for reduction of Flexural Vibrations and Structure-Borne Sound" *Proc. AIA-DAGA* (2013) pp. 1-4.

Bowyer, et al. "Damping of flexural vibrations in plates containing ensembles of tapered indentations of power-law profile" *Proc. Meet. Acoustics* 18 (2013) pp. 1-11.

Bowyer, et al. "Experimental investigation of damping flexural vibrations in plates containing tapered indentations of power-law profile" *Appl. Acoust.* 74(4) (2013) pp. 553-560.

Bowyer, et al. "Experimental investigation of damping flexural vibrations in glass fibre composite plates containing one- and two-dimensional acoustic black holes" *Compos. Struct.* 107 (2014) pp. 406-415.

Bowyer, et al. "Damping of flexural vibrations in turbofan blades using the acoustic black hole effect" *Appl. Acoust.* 76 (2014) pp. 359-365.

Burtovyy, et al. "Hydrophobic modification of polymer surfaces via "grafting to" approach" *J. Macromolec. Sci. Pt. B: Phys.* 46(1) (2007) pp. 137-154.

Burtovyy, et al. "Modification of nylon membrane surface with thin polymer layer via "grafting to" approach" *Polym. Preprints* 48(1) (2007) 725.

(56) References Cited

OTHER PUBLICATIONS

Burtovyy, et al. "Polymeric membranes: surface modification by "grafting to" method and fabrication of multilayered assemblies" *Nanosci. Nanotechn. Chem. Biol. Def.* 1016 (2009) pp. 289-305. (Abstract only).

Burtovyy, et al. "Surface Differential Scanning Calorimeter for Evaluation of Evaporative Cooling Efficiency" *J. Eng. Fibers Fabr.* 7 (2012) pp. 58-62.

Cardone, et al. "'Absorption' effect for elastic waves by the beak-shaped boundary irregularity" *Doklady Physics* 54(3) (2009) pp. 146-150.

Chyasnavichyus, et al. "Tuning Fluorescent Response of Nanoscale Film With Polymer Grafting" *Macromol. Rap. Comm.* 33(3) (2012) pp. 237-241.

Conlon, et al. "Enhancing the low frequency vibration reduction performance of plates with embedded Acoustic Black Holes" *Internoise* (2014) pp. 1-8.

Coppola et al. "Analysis of Feasibility on the Use of Fiber Bragg Grating Sensors as Ultrasound Detectors" *SPIE* (2001) pp. 224-232.

Cuenca, et al. "Vibration damping in polygonal plates using the acoustic black hole effect: model based on the image source method" *20ème Congrès Français de Mécanique* (2011) pp. 1-5.

Cuenca, et al. "Improving the acoustic black hole effect for vibration damping in one-dimensional structures" *Proc. Acoustics* (2012) pp. 2189-2191.

Denis, et al. "Increasing the modal overlap factor of a beam using acoustic black hole effect" *11th Int'l Conf. Vibr. Prob.* (2013) pp. 1-9.

Denis, V. "Vibration damping in beams using the acoustic black hole effect" *Université Du Maine* (2014) pp. 1-144.

Denis, et al. "Modal Overlap Factor of a beam with an acoustic black hole termination" *J. Sound Vibr.* 333(12) (2014) pp. 2475-2488.

Denis, et al. "Measurement and modelling of the reflection coefficient of an Acoustic Black Hole termination" *J. Sound Vibr.* 349 (2015) pp. 67-79.

Denis, et al. "Scattering effects induced by imperfections on an acoustic black hole placed at a structural waveguide termination" *J. Sound Vibr.* 362 (2016) pp. 56-71.

Donahue, et al., "Long-Term Recurrent Convolutional Networks for Visual Recognition and Description" *IEEE Conf. CVPR* (2015) pp. 2625-2634.

Draper, et al. "Mixed Polymer Brushes by Sequential Polymer Addition: Anchoring Layer Effect" *Langmuir* 20 (2004) pp. 4064-4075.

Elbatanouny, et al. "Identification of Cracking Mechanisms in Scaled FRP Reinforced Concrete Beams using Acoustic Emission" *Exper. Mech.* 54 (2014) pp. 69-82.

Elbatanouny, et al. "Corrosion Intensity Classification in Prestressed Concrete using Acoustic Emission Technique" *Proc. Am. Soc. Nondestr. Test.* (2011) pp. 1-8.

Feurtado, et al. "A normalized wave number variation parameter for acoustic black hole design" *J. Acoust. Soc. Am.* 136(2) (2014) pp. EL148-EL152.

Feurtado, et al. "Investigation of boundary-taper reflection for acoustic black hole design" *Noise Control Eng. J.* 63(5) (2015) pp. 460-466.

Fischer, et al., "Optimizing a neural network for detection of moving vehicles in video" *Proc. SPIE* 10441 (2017) pp. 1-10.

Fowler, et al. "New Directions in Testing" *Proc. 3rd International Symposium on AE from Composite Materials*, Paris, France. (1989).

Georgiev, et al. "Recent progress in vibration reduction using Acoustic Black Hole effect" *10ème Congrès Français d'Acoustique*, (2010) pp. 1-6.

Georgiev, et al. "Vibration reduction of beams and plates using Acoustic Black Hole effect" *39th Int'l Congr. Expo. Noise Congr. Eng.* (2010) pp. 1-10.

Georgiev, et al. "Damping of structural vibrations in beams and elliptical plates using the acoustic black hole effect" *J. Sound Vibr.* 330(11) (2011) pp. 2497-2508.

Godinez-Azcuaga, et al. "Recent Advances in the Development of a Self-Powered Wireless Sensor Network for Structural Health Prognosis" *Proc. SPIE* 7983:798325 (2011) pp. 1-7.

Grondel, et al. "Ch. 4: Application of the Piezoelectricity in an Active and Passive Health Monitoring System" *Piezo. Mater. Dev.* (2013) pp. 69-92.

Hu, et al., "SINet: A Scale-insensitive Convolutional Neural Network for Fast Vehicle Detection" *IEEE Trans. Intell. Transp. Sys.* (2018) pp. 1-10.

Huang, Q. (2013) "AE-based Structural Health Monitoring for Composite Cryogenic Tanks" *55th Meet. Acoustic Emiss. Work. Gr.* (2013).

Huang, et al. "Structural Health Monitoring of DC-XA LH$_2$ Tank using Acoustic Emission" *Structural Health Monitoring: Current Status and Perspectives* (1998) pp. 301-309. (Abstract only).

Idrissi, et al. "Study and characterization by acoustic emission and electrochemical measurements of concrete deterioration caused by reinforcement steel corrosion" *NDT&E Int'l.* 36(8) (2003) pp. 563-569.

Iyer, et al. "Polystyrene Layers Grafted to Macromolecular Anchoring Layer" *Macromolecules* 36 (2003) pp. 6519-6526.

Kovalenko, et al. "A Major Constituent of Brown Algae for Use in High-Capacity Li-Ion Batteries" *Science* 334 (2011) pp. 75-79.

Kralovic, et al. "Damping of flexural vibrations in tapered rods of power-law profile: experimental studies" *Proc. Inst. Acoust.* 29(5) (2007) pp. 66-73.

Kralovic, et al. "Some new methods of damping impact-induced vibrations in badminton racquets" *Proc. Inst. Acoust.* 30(2) (2007) pp. 155-162.

Krylov, V. "Localized acoustic modes of a quadratic solid wedge" *Moscow Univ. Phys. Bull.* 45(6) (1990) pp. 65-69.

Krylov, V. "Acoustic 'black holes' for flexural waves and their potential applications" *Proc. Instit. Acoustics* (2002) pp. 25-27.

Krylov, et al. "Acoustic 'Black Holes' for Flexural Waves as Effective Vibration Dampers" *J. Sound Vibr.* 274(3) (2004) pp. 605-619.

Krylov, V. "New type of vibration dampers utilising the effect of acoustic 'black holes'" *Acta Acust. United with Acust.* 90(5) (2004) pp. 830-837.

Krylov, V. "Damping of resonant vibrations utilising the acoustic black hole effect" *Int'l Conf. Noise Vibr. Emerg. Techn.* (2005) pp. 1-12.

Krylov, et al. "Experimental evidence of the acoustic black hole effect for flexural waves in tapered plates" *12th Int'l Congr. Sound Vibr.* (2005) pp. 1-8.

Krylov, et al. "Experimental investigation of the acoustic black hole effect for flexural waves in tapered plates" *J. Sound Vibr.* 300(1) (2007) pp. 43-49.

Krylov, V. "Propagation of plate bending waves in the vicinity of one- and two-dimensions acoustic 'black holes,'" *ECCOMAS Them. Conf. Comp. Meth. Struct. Dyn. Earthq. Eng.* (2007) pp. 1-12.

Krylov, V. "Geometrical acoustics approximation for Rayleigh and Lamb waves" *9th Int'l Conf. Cond. Monitor. Mach. Fail. Prev. Techn.* (2012) pp. 1-12.

Krylov, V. "Acoustic black holes and their applications for vibration damping and sound absorption" *Proc. ISMA* (2012) pp. 933-944.

Krylov, et al. "Acoustic Black Holes: a New Approach To Vibration Damping in Light-Weight Structures" *Proc. Instit. Acoustics* 35(1) (2013) pp. 184-191.

Krylov, V. "Acoustic black holes: recent developments in the theory and applications" *IEEE Trans. Ultrason. Ferroelectr. Freq. Control* 61(8) (2014) pp. 1296-1306.

Li, et al. "Fabrication of paper-based microfluidic sensors by printing." *Coll. Surf. B: Biointerfaces* 76(2) (2010) pp. 564-570.

Liu, et al. "To Patterned Binary Polymer Brushes via Capillary Force Lithography and Surface-Initiated Polymerization." *J. Am. Chem. Soc.* 128(25) (2006) pp. 8106-8107. (Abstract only).

Liu, et al. "Polymer Grafting via ATRP Initiated from Macroinitiator Synthesized on Surface" *Langmuir* 20 (2004) pp. 6710-6718.

Liu, et al. "Synthesis of High-Density Grafted Polymer Layers with Thickness and Grafting Density Gradients" *Langmuir* 21 (2005) pp. 11806-11813.

(56) References Cited

OTHER PUBLICATIONS

Liu, et al. "Segregated polymer brushes via "grafting to" and ATRP "grafting from" chain anchoring" *Controlled/Living Radical Polymerization: Progress in ATRP*, 1023, (2009) pp. 215-230. (Abstract only).
Lomonosov, et al. "Orbital-type trapping of elastic Lamb waves" *Ultrasonics* 64 (2016) pp. 58-61.
Luo, et al., "Numerical Analysis and Optimization of Optical Spectral Characteristics of Fiber Bragg Gratings Modulated by a Transverse Acoustic Wave" *Appl. Opt.* 46(28) (2007) pp. 6959-6965.
Luzinov, I., "Nanofabrication of thin polymer films" *Nanofibers and Nanotechnology in Textiles* (2007) pp. 448-469.
Luzinov, et al. "Responsive brush layers: from tailored gradients to reversibly assembled nanoparticles" *Soft Matter* 4(4) (2008) pp. 714-725.
Mangual, et al. "Acoustic-Emission-Based Characterization of Corrosion Damage in Cracked Concrete with Prestressing Strand" *ACI Mater. J.* 110(1) (2013) pp. 89-98.
Minardo et al. "Response of Fiber Bragg Gratings to Longitudinal Ultrasonic Waves" *IEEE Trans. Ultras. Ferroelec. Freq. Contr.* 52(2) (2005) pp. 304-312.
Mirinov, M. "Propagation of a flexural wave in a plate whose thickness decreases smoothly to zero in a finite interval" *Sov. physics. Acoust.* 34(3) (1988) pp. 318-319.
Mironov, et al. "One-dimensional acoustic waves in retarding structures with propagation velocity tending to zero" *Acoust. Phys.* 48(3) (2002) pp. 347-352.
Motornov, et al. "Field-Directed Self-Assembly with Locking Nanoparticles" *Nano Letters* 12(7) (2012) pp. 3814-3820.
Naify, et al. "Underwater acoustic omnidirectional absorber" *Appl. Phys. Lett.* 104(7):073505 (2014) pp. 1-4.
O'Boy, et al. "Damping of flexural vibrations in rectangular plates using the acoustic black hole effect" *J. Sound Vib.* 329(22) (2010) pp. 4672-4688.
O'Boy, et al. "Point mobility of a cylindrical plate incorporating a tapered hole of power-law profile" *J. Acoust. Soc. Am.* 129(6) (2011) pp. 3475-3482.
O'Boy, et al. "Vibration of a rectangular plate with a central power-law profiled groove by the Rayleigh-Ritz method" *Appl. Acoust.* 104 (2016) pp. 24-32.
Offringa, et al. "Butt-joined, Thermoplastic Stiffened-skin Concept Development" *Sampe J.* 48(2) (2012) pp. 7-15.
Pollock, A.A. "Classical Wave Theory in Practical AE Testing" *Progress in AE III—Jap. Soc. Nondestr. Test.* (1986) pp. 708-721.
Ramaratnam, et al. "Ultrahydrophobic textile surface via decorating fibers with monolayer of reactive nanoparticles and non-fluorinated polymer" *Roy. Soc. Chem.* (2007) pp. 1-5.
Remillieux, et al. "Improving the Air Coupling of Bulk Piezoelectric Transducers with Wedges of Power-Law Profiles: A Numerical Study" *Ultrasonics* 54(5) (2014) pp. 1409-1416.
Seeber, et al. "Surface grafting of thermoresponsive microgel nanoparticles" *Soft Matter* 7(21) (2011) pp. 9962-9971.
Singh, et al. "Surface modification of microporous PVDF membranes by ATRP" *J. Membr. Sci.* 262(1-2) (2005) pp. 81-90.
Swamy. "The Alkali-Silica Reaction in Concrete" Blackie and Son Ltd. (1992) pp. 1-348.
Tsyalkovsky, et al. "Fluorescent Reactive-Core-Shell Composite Nanoparticles with a High Surface Concentration of Epoxy Functionalities" *Chem. Mater.* 20(1) (2008) pp. 317-325. (Abstract only).
Van Ingen, et al. "Development of the Gulfstream G650 Induction Welded Thermoplastic Elevators and Rudder" *SAMPE Int'l Conf. Exhib.* (2010) pp. 1-16.
Vatansever, et al. "Toward Fabric-Based Flexible Microfluidic Devices: Pointed Surface Modification for pH Sensitive Liquid Transport" *ACS Appl. Mater. Interf.* 4(9) (2012) pp. 4541-4548.
Wevers, et al. "Ultrasonic Lamb Wave Inspection of Aircraft Components Using Integrated Optical Fibre Sensing Technology" *ECNDT* Mo.2.7.1 (2006) pp. 1-10.
Zdyrko, et al. "Nano-patterning with polymer brushes via solvent-assisted polymer grafting" *Soft Matter* 4 (2008) pp. 2213-2219.
Zdyrko, et al. "Toward protein imprinting with polymer brushes" *BioInterphases* 4(2) (2009) pp. FA17-FA21.
Zdyrko, et al. "Macromolecular anchoring layers for polymer grafting: comparative study" *Polymer* 47(1) (2006) pp. 272-279.
Zdyrko, et al. "Fabrication of optically active flexible polymer films with embedded chain-like arrays of silver nanoparticles" *Chem. Commun.* (2008) pp. 1284-1286.
Zdyrko, et al. "Synthesis and Surface Morphology of High-Density Poly(ethylene glycol) Grafted Layers" *Langmuir* 19(24) (2003) pp. 10179-10187.
Zdyrko, et al. "Polymer brushes as active nanolayers for tunable bacteria adhesion" *Mater. Sci. Eng. C* 29 (2009) pp. 680-684.
Zdyrko, et al. "Polymer Brushes by the "Grafting to" Method." *Macromol. Rap. Comm.* 32(12) (2011) pp. 859-869.
Zhang, et al. "Build Orientation Determination for Multi-material Deposition Additive Manufacturing with Continuous Fibers" *Procedia CIRP* (2016) pp. 1-6.
Zhao, et al. "Broadband energy harvesting using acoustic black hole structural tailoring" *Smart Mater. Struct.* 23(6) (2014) pp. 1-9.
Zhu, et al. "Phononic thin plates with embedded acoustic black holes" *Phys. Rev. B* 91(10) (2015) pp. 104304-104308.
Zhu, et al. "Design of embedded acoustic lenses in plate-like structures based on periodic acoustic black holes" *Proc. SPIE* 9435:94350K (2015) pp. 1-9.
Ziehl, et al. "Built-In Damage State Detection and Localization Capabilities for Composite Engine Structures" *USAF* AF093-179 Phase II (2013).
Ziehl, et al. (2013) "Innovative Structural Health Monitoring(SHM) System Capable of Detecting, Localizing, and Characterizing Damage in Composite Aircraft Structures" *US Navy* N122-110 Phase I (2013) pp. 1-11.
Ziehl, P. "Applications of Acoustic Emission Evaluation for Civil Infrastructure" *Proc. SPIE* (2008) pp. 1-9.

* cited by examiner

INTEGRATED AND AUTOMATED VIDEO/STRUCTURAL HEALTH MONITORING SYSTEM

PRIORITY CLAIM

The present application claims the benefit of priority of U.S. Provisional Patent Application No. 62/742,499, titled "Integrated and Automated Video/Structural Health Monitoring System," filed Oct. 8, 2018, which is fully incorporated herein by reference for all purposes.

BACKGROUND OF THE PRESENTLY DISCLOSED SUBJECT MATTER

Structural health monitoring (SHM)/nondestructive evaluation (NDE) exists as a tool in conjunction with complex structural systems, some of which are related to the transportation infrastructure.

Acoustic emission technology has been successfully utilized in structural health assessment of devices and components for many years. In many instances, acoustic emission has been used as a global screening method of structures (e.g., storage vessels), often followed with non-destructive examination methods such as ultrasonics when damage is detected or suspected. Acoustic emission screening has also been used within the aerospace industry for in-flight monitoring, during static testing, and for impact detection both in the air and on the ground.

Transportation networks are complex, interdependent, and critical for safety. Many transportation networks do not operate with embedded intelligence. Evaluation of bridges is often conducted through visual inspection sometimes supplemented with nondestructive methods. This has proven generally effective but drawbacks can remain. For example, unplanned closures or lane closures can become a temporary necessity whenever previously unknown physical damage is discovered from a visual examination, such as the fracture of a bridge cable discovered during a walk-through. Certain systems exist which include some monitoring related to bridges, such as those from Mistras Group, Inc.; Olson Engineering; and Bridge Diagnostics, Inc.

Generally speaking, the causes of degradation for bridges and certain other structures are not well understood. In particular, the effect of traffic loading versus environmental loading is not broadly understood.

Structural Health Monitoring (SHM) offers the possibility of detecting, for example, such a bridge cable fracture long before it occurs. One drawback of SHM systems has been the 'black box' nature of data interpretation, and as in most cases, the forcing function (truck/vehicle loading, temperature effects, etc.) is not well understood. This is particularly true for truck/vehicle loading. To address such drawback, use of a field deployable integrated SHM system that autonomously evaluates—and potentially controls—vehicular loading on bridges is presently disclosed. Such a presently disclosed approach may constitute, in essence, a Computer Vision-based system for Autonomous Bridge Evaluation. The presently disclosed approach is forward looking and envisions full integration between autonomous vehicles and physical infrastructure for optimization of traffic patterns to enhance safety (i.e., re-routing of traffic) and to improve resiliency (i.e., autonomously controlling inter-vehicle spacing to minimize damage due to truck traffic on a bridge).

Presently disclosed subject matter integrates automated video with a structural health monitoring system. In conjunction with bridge monitoring, integration of such two systems automates determination of the effect or correlation of vehicular loading on SHM data from a subject bridge. Such correlations help to understand the sources of structural health monitoring data, particularly acoustic emission data, in bridges and other structures, such as dams and nuclear plants. Automation of the evaluation of bridges and other structures increases accuracy and minimizes risk to workers and the public. Assessing the structural condition of bridges and other structures as presently disclosed also facilitates automated asset management of transportation systems, such as by state departments of transportation and other bridge/structural owners.

SUMMARY OF THE PRESENTLY DISCLOSED SUBJECT MATTER

Aspects and advantages of the presently disclosed subject matter will be set forth in part in the following description, or may be apparent from the description, or may be learned through practice of the presently disclosed subject matter.

Broadly speaking, the presently disclosed subject matter relates to an integrated system for the correlation of vehicular loading with structural health monitoring data. Such correlation helps responsible parties to better understand the source of structural health monitoring data in bridges and other structures, particularly (but not limited to) acoustic emission data as the cause of the data is often otherwise not understood.

Another presently disclosed broader object is to provide computer vision for autonomous bridge evaluation.

Yet another aspect of the presently disclosed subject matter is to improve technology areas related to connected multimodal mobility; innovations to improve multi-modal connections, system integration, and security; data modeling and analytical tools to optimize passenger and freight movements.

Still other aspects of the presently disclosed subject matter relate to innovations in multi-modal planning and modeling for high-growth regions. Some other instances relate to improvements in regional planning and setting of transportation priorities. For example, such resulting improvements may relate in part to assessing regional needs through deployment of a system on local bridges (some in underserved communities) and with specialization to a focused transportation network.

Some embodiments of presently disclosed subject matter relate to systems for transforming connectivity between physical infrastructure and vehicles, in some instances combining aspects of remote evaluation of infrastructure (Civil/Structural Engineering) and computer vision/analytics (Computer Science), along with subject matter encompassing transportation systems and autonomous vehicles (Transportation Engineering).

Some presently disclosed subject matter relates to providing computer vision based structural health monitoring system for bridges.

Still further, presently disclosed subject matter in part may relate to improvement in the state of the art for structural monitoring and evaluation, leading to increased connectivity between infrastructure for vehicles, increased safety, and more informed decision making.

In some forms, various aspects of the presently disclosed subject matter may relate to important elements for a smarter multimodal transportation system, by more directly addressing a core mission of building multimodal transportation through connectivity, data analytics, and automation. In such context, the subject matter for some presently disclosed embodiments may address creation of: a) resilient and intelligent infrastructure systems; b) smart investments in transportation systems; c) investment in underserved and underinvested communities; and d) improvements to health and safety.

One presently disclosed exemplary embodiment relates to a system for structural health monitoring of a structure, comprising at least one sensor, a computerized vision system, a data acquisition system, and a processing system. Preferably, for such embodiment, such at least one sensor is associated with a structure to be monitored and acquiring sensor data therefrom; such computerized vision system is for acquiring video data associated with such structure; such data acquisition system is in communication with the sensor for receiving sensor data therefrom, and in communication with the vision system for receiving video data therefrom; and such processing system is in communication with the data acquisition system and configured for correlating such sensor data and such video data for identifying a potentially damaging event to such structure.

In some embodiments of the foregoing, the structure to be monitored may be a support component of a bridge; such sensor may be an acoustic emission sensor which may be one of attached to, embedded in, or associated with the structure to be monitored; and such video data may comprise images of vehicle loading on the bridge. In still some further variations thereof, such video data may include at least one of type of vehicle, a vehicle specific location on the bridge, and distance from other vehicles on the bridge; and such processing system correlating of such sensor data and such video data may comprise associating acoustic emissions with specific vehicles crossing the bridge. In yet other further variations thereof, such video data may comprise a plurality of relatively high-definition images; and such processing system correlating may include correlating such sensor data and video data for a predetermined sample period of time.

In other present alternatives, in some instances, the structure to be monitored may comprise a component of at least one of a bridge, a dam, and a power generation station, and such sensor may sense at least one of acoustic emission, strain, temperature, and crack mouth opening displacement of such component.

In still other alternatives, such sensor in some instances may detect stress waves in an associated structure.

For some other present alternatives, such sensor may comprise at least one of an acoustic emission, piezoelectric, through-transmission, shear-wave, resonance, or mechanical impedance sensor in an organized array comprising multiple sensors; and such data acquisition system may be in communication with such array of multiple sensors for receiving sensor data therefrom.

It is to be understood from the complete disclosure herewith that the presently disclosed subject matter equally relates to both apparatus and corresponding and related methodology.

One presently disclosed exemplary methodology preferably relates to a method for structural health monitoring of a structure. Such method preferably comprises acquiring sensor data from at least one sensor associated with a structure to be monitored; acquiring video data associated with such structure; and correlating such sensor data and such video data for identifying a potentially damaging event to such structure.

In some such methods, the structure to be monitored may be a bridge.

In yet other exemplary variations thereof, the structure to be monitored may be a support component of a bridge, and the sensor may be one of attached to, embedded in, or associated with the structure. In some such embodiments, the sensor may be an acoustic emission sensor, and the video data comprises images of vehicle loading on the bridge. In yet others thereof, correlating such sensor data and such video data may comprise associating acoustic emissions with specific vehicles crossing the bridge. For some, the video data may include at least one of type of vehicle, a vehicle specific location on the bridge, and distance from other vehicles on the bridge.

In yet other variations of presently disclosed such methodologies, the structure to be monitored may comprise a component of at least one of a bridge, a dam, and a power generation station.

In yet other variations, the methodology may further include correlating the sensor data and video data for a predetermined sample period of time. In some such instances, such predetermined sample period of time may comprise a preset number of hours.

For other present variations, acquiring video data may comprise taking and storing a plurality of relatively high-definition images. For some such variations, acquiring video data may comprise taking and storing a plurality of relatively high-definition images for a minimum of 30 frames per second.

For other presently disclosed alternatives of the foregoing, the sensor may sense at least one of acoustic emission, strain, temperature, and crack mouth opening displacement.

For others, the sensor may be an acoustic emission sensor for sensing acoustics from an ambient event, and the potentially damaging event may be correlated with acquiring a predetermined acoustic signature. Per yet other presently disclosed alternatives, the sensor may be one of a passive sensor and an active sensor.

For others, the sensor may be an acoustic emission sensor. For some such variations, the sensor may detect stress waves in an associated structure.

In some cases of still further alternatives of the foregoing, the sensor may be at least one of an acoustic emission, piezoelectric, through-transmission, shear-wave, resonance, or mechanical impedance sensor.

Per other variations, the sensor may be a single sensor in an organized array comprising multiple sensors, the method comprising acquiring data from the multiple sensors. For some such variations, the multiple sensors of the array may be in wired communication with one another.

Additional objects and advantages of the presently disclosed subject matter are set forth in, or will be apparent to, those of ordinary skill in the art from the detailed description herein. Also, it should be further appreciated that modifications and variations to the specifically illustrated, referred and discussed features, elements, and steps hereof may be practiced in various embodiments, uses, and practices of the presently disclosed subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the presently disclosed subject matter may include various combinations or configurations of presently disclosed features, steps, or elements, or their equivalents (including combinations of features, parts, or steps or configurations thereof not expressly shown in the Figures or stated in the detailed description of such Figures.). Additional embodiments of the presently disclosed subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification, and will appreciate that the presently disclosed subject matter applies equally to corresponding methodologies as associated with practice of any of the present exemplary devices, and vice versa.

BRIEF DESCRIPTION OF THE FIGURES

A full and enabling disclosure of the presently disclosed subject matter, including the best mode thereof, directed to one of ordinary skill in the art, is set forth in the specification, which makes reference to the appended Figures, in which.

Repeat use of reference characters in the present specification and drawings is intended to represent the same or analogous features or elements or steps of the presently disclosed subject matter.

DETAILED DESCRIPTION OF THE PRESENTLY DISCLOSED SUBJECT MATTER

It is to be understood by one of ordinary skill in the art that the present disclosure is a description of exemplary embodiments only, and is not intended as limiting the broader aspects of the disclosed subject matter. Each example is provided by way of explanation of the presently disclosed subject matter, not limitation of the presently disclosed subject matter. In fact, it will be apparent to those skilled in the art that various modifications and variations can be made in the presently disclosed subject matter without departing from the scope or spirit of the presently disclosed subject matter. For instance, features illustrated or described as part of one embodiment can be used with another embodiment to yield a still further embodiment. Thus, it is intended that the presently disclosed subject matter covers such modifications and variations as come within the scope of the appended claims and their equivalents.

Figure 1A:
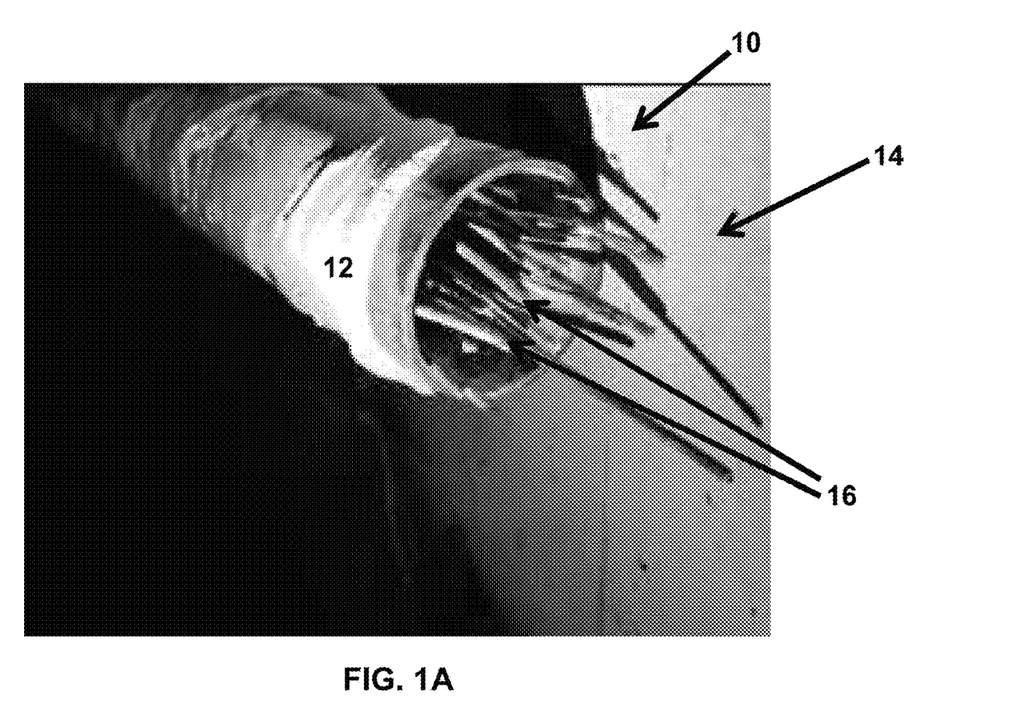
FIG. 1A illustrates a representative damaged cable from an associated exemplary bridge with which an embodiment of presently disclosed subject matter may be practiced.
Figure 1B:
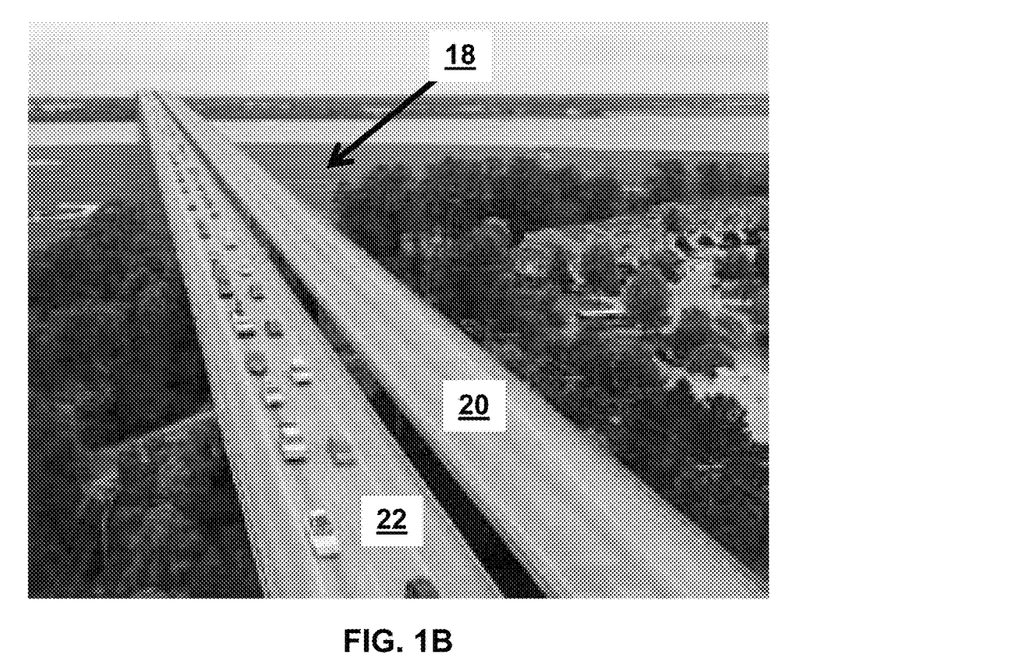
FIG. 1B illustrates an associated exemplary bridge which may be associated with the representative damaged cable of FIG. 1A, and with which an embodiment of presently disclosed subject matter may be practiced.

The present disclosure is generally directed to a non-intrusive monitoring method and system for the detection of damage that may occur or may exist in an existing structure such as a bridge or other specialized structure. FIG. 1A illustrates a representative damaged cable from an associated exemplary bridge with which an embodiment of presently disclosed subject matter may be practiced. FIG. 1B illustrates an associated exemplary bridge which may be associated with the representative damaged cable of FIG. 1A, and with which an embodiment of presently disclosed subject matter may be practiced.

More specifically, FIG. 1A represents a damaged (in this instance, broken) cable generally 10. Such cable 10 may have protective multiple layers of sheathing generally 12 which have become damaged, degraded, or missing so as to expose such as a plurality of various internal cable wires generally 14. When individual wires are broken, they can leave exposed ends generally 16.

Modern bridges generally 18 as shown for example by FIG. 1B may in fact comprise separate side-by-side bridges, each supporting traffic in a respective direction. If a cable generally 10 is associated such as with side 20 of bridge 18, and cable 10 has broken wires 16 (such as represented by FIG. 1A), the side 20 may need to be closed to all traffic during assessment and/or repair of the broken wires/cable. The separation of sides 20 and 22 may still allow traffic on side 22, but the closure of side 20 still adversely impacts the flow of traffic on bridge 18, even if temporarily side 22 (which in this instance is shown as having multiple lanes) is used for traffic flowing in both directions.

A bridge may have any number of various possible failure points or attributes which might be subject to inspection and scrutiny. For example, in addition to cables and wires, there may be associated support connections, support beams or columns, and/or bridge decking and other features to consider. Potential damage or damage events may involve those occurring by a manufacturing process as well as those that can impact the resulting product or workpiece (structure) while in place and being used. Damage as may be detectable by a system can include flaws or defects within or along the surface of a structure that could adversely affect its performance such as, without limitation, delamination, matrix cracking, disbonds (e.g., between a frame and reinforcing members or honeycomb composites), discontinuities, voids, porosity, etc.

Beneficially, a monitoring system in some embodiments can utilize one or more acoustic emission sensors that can accurately communicate (wired or wirelessly) potentially damaging events to data storage and/or processing systems. As a presently disclosed system can provide continuous monitoring, it can have a significant impact on monitoring capabilities in the field.

According to some embodiments of the presently disclosed subject matter, an integrated autonomous monitoring and evaluation system would incorporate so-called Computer Vision with such monitoring for real time assessment/decision making.

Presently disclosed subject matter makes strides in automation, based in some instances in part on classification of experiential data (for example, truck type, vehicle to vehicle distance, daytime versus night time conditions) and structural prognostics based on fusion of the video data with other data inputs. As autonomous vehicles become reality, other embodiments may relate to direct communications between vehicles and SHM systems. Other embodiments may make use of remote power/wireless data transmission technology and/or internet of things (IoT) based technology to provide an integrated system of interrelated computing devices and/or mechanical and digital machines.

Figure 2:
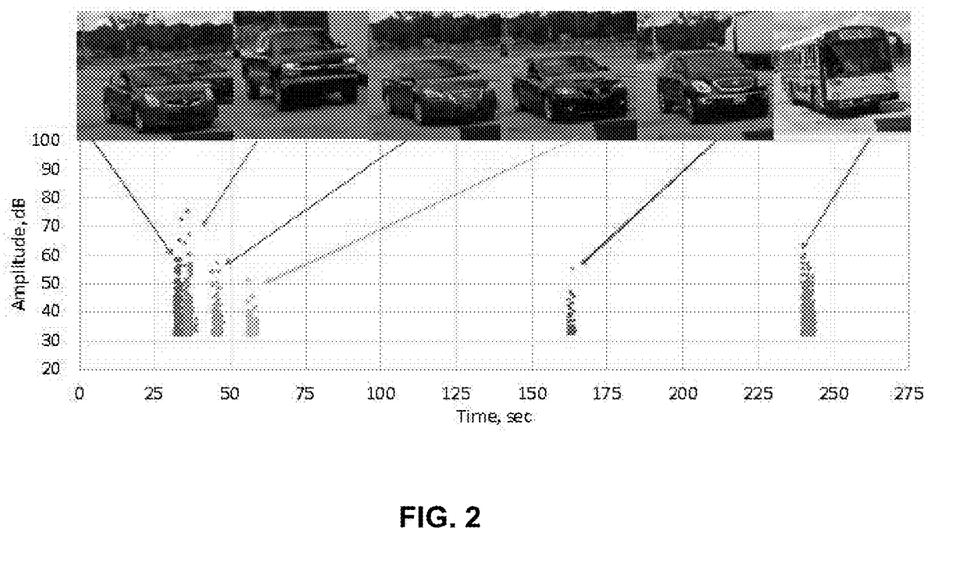
FIG. 2 is an example of Structural Health Monitoring (SHM) data showing amplitude of waveforms versus time, recorded from a bridge such as represented by FIG. 1B and correlated to associated vehicle loading.

A computer vision-based approach to bridge evaluation is demonstrated by the representations in FIG. 2. More specifically, FIG. 2 provides an example of acoustic emission (one type of SHM data), in this case plotted as amplitude (dB) versus time, shown as would be gathered from an associated bridge location due to different vehicle loadings. As demonstrated, different vehicles, and different lane positions, result if different types of acoustic emission data. Thus, FIG. 2 is an example of Structural Health Monitoring (SHM) data showing amplitude of waveforms versus time, recorded from a bridge such as bridge 18 represented by FIG. 1B and correlated to associated vehicle loading such as in lane 22 of bridge 18.

The presently disclosed subject matter integrates video data (through Computer Vision) with SHM data to enable improved analysis/correlation (understanding) of the response of physical infrastructure to vehicular loading. Further embodiments can refine data in classification (truck type, vehicle to vehicle distance, daytime versus night time conditions) and structural prognostics based on fusion of the video data with other data inputs. As FIG. 2 shows, it is possible to identify (correlate) the vision data with type of vehicle, its specific location on the bridge and distance from others, etc. As autonomous vehicles become reality, further embodiments may relate to direct communications between vehicles and SHM systems.

Presently disclosed methodology encompasses deploying integrated video/SHM system on actual in-use bridges. Such bridges may be used for the first time in such forms of evaluation, or may already be associated with baseline SHM data (without Computer Vision) that has already been gathered. Further data to be gathered will include, for example, video data in correlation with SHM data over a predetermined period of time. For example, a preset number of hours, such as at least a 48-hour period, may be sampled. The video camera may have relatively high-definition image capabilities, such as five megapixel or better resolution and a minimum of 30 frames per second. SHM data may be collected with a wireless data acquisition system (multi-channel node), as well as, for example, a 32-channel hard-wired data acquisition system. SHM data may be continuously monitored and may include acoustic emission, strain, temperature, and crack mouth opening displacement.

Figure 3:
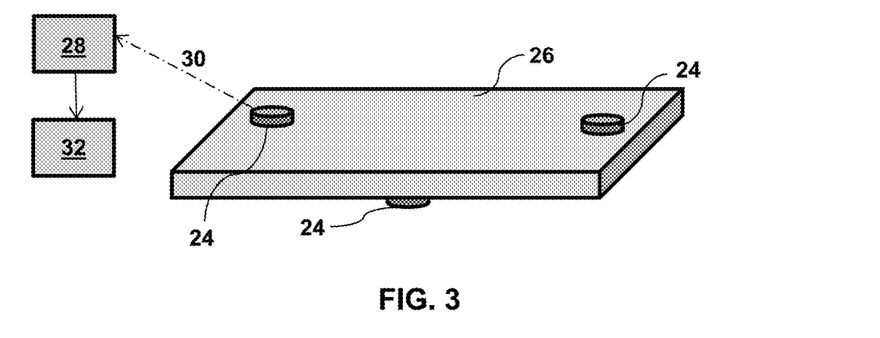
FIG. 3 schematically illustrates an exemplary embodiment of an integrated and automated video/structural health monitoring system as disclosed herein.

As schematically illustrated in FIG. 3, a system can utilize one or more acoustic emission sensors 24 that can be embedded in or otherwise attached to or associate with a structure 26. Such structure 26 may comprise a portion of a bridge 18, as referenced above. In one exemplary embodiment, a monitoring method can be performed by use of an acoustic structural health monitoring system that utilizes passive sensors 24. A passive structural health monitoring system can monitor for acoustic emission in an area by use of a sensor that "listens" but does not adversely interact with the structure on which the sensor is mounted. As such, the general health state of the structure and/or the local environment can be inferred from analysis of the response of the passive sensor(s) and the sensors can continually or periodically obtain information automatically with no additional input necessary (e.g., no need to interrogate the sensors).

An either wired or wireless acoustic system and method can be used to monitor any number of multiple different types of structures in a variety of settings where detection of flaws or defects in or near a structure, such as a bridge, can be of benefit.

Monitoring systems can be beneficial when incorporated with manufacture of box-type structures (i.e., structures that include walls partially or completely surrounding an open area), as the acoustic-based sensing technology can be particularly effective with such structures. It should be understood, however, that a portion of a particular structure is not limited as to materials, and materials including, without limitation, plastics, plywood panels, metal panels, solid wood panels, inorganic composite panels (e.g., concrete), etc. are encompassed herein. Moreover, an associated structure for monitoring is not limited to box-like structures, and other structures are encompassed herein.

Referring again to FIG. 3, for some embodiments at least one acoustic emission sensor 24 may be attached to or associated with a structure 26. Sensor 24 can be temporarily or permanently attached to a structure 26. Alternatively, a sensor 24 can be located on or in a structure in such a fashion that later recovery would be difficult or impossible (e.g., inside of an enclosed box), in which case the sensor can be permanently attached to the surface (or implanted in the surface) and can be left in the structure.

A sensor 24 can be configured for acquiring data in response to potentially damaging events associated with the structure 26. In some embodiments, a sensor 24 can be any suitable sensor or transducer capable of receiving an ambient signal and transmitting or storing a response to that signal for communication with a data acquisition/processing system. Each sensor 24 in some embodiments may comprise a non-destructive passive sensor, such that the sensor is capable of acquiring acoustic data without interrogation and without harming the structure or requiring disassembly of the structure.

In one preferred embodiment, a sensor 24 can be a piezoelectric sensor. However, various other sensors may be employed with a given system or embodiment, such as through-transmission, shear-wave, resonance, or mechanical impedance sensors. Furthermore, the sensor 24 may be any number of sizes and configurations depending on a variety of factors, such as the size, configuration, or type of material of the structure 26, the type of sensor, and/or the type of events desired to be monitored.

While a sensor can provide multiple different types of information, a sensor 24 can primarily be utilized to recognize the occurrence of a potentially damaging event within or on the surface 26 and within the general area of the sensor 24. For instance, a single sensor 24 can be utilized to monitor about 2 linear feet or more, about 4 linear feet or more, or about 5 linear feet or more along the surface of a structure 26 in any direction from the sensor. In some embodiments, a single sensor 24 can monitor about 40 linear feet or less, for instance about 30 linear feet or less, or about 20 linear feet or less along the surface of a structure 26 in any direction from the passive sensor.

In some embodiments, a plurality of sensors 24 can be arranged on a surface 26, for instance in an array or grid. Depending upon the nature of the sensors 24 and the surface 26, a system can include current paths or signal lines to and from each sensor 24, for example via wires that physically attach the sensors 24 to one another. The thus-formed network can serve to aggregate signals from sensors 24. In such an embodiment, the sensors can wirelessly communicate with a data acquisition system 28 with a single signal 30. Of course, separate wireless or wired communication may extend between each respective sensor 24 and the data acquisition system 28 as well.

In conjunction with the passive sensor(s) 24, the system also includes a data acquisition system 28 capable of communicating with the passive sensor(s) 24 via a wireless or wired signal 30 and a processing system 32 capable of communication with the data acquisition system 28. The data acquisition and processing systems 28, 32 are capable of providing information concerning a potential damaging event occurring to or near the structure 26 based on the data acquired by the passive sensor(s) 24 in responses to the ambient events.

In one embodiment, the data acquisition system 28 can be carried with the sensor 24 on the surface. However, in other embodiments, the data acquisition and processing systems 28, 32 can be remote from the structure 26, which can decrease weight and space requirements of the system.

In one embodiment, the data acquisition system 28 can include a memory device by which data from a sensor 24 can be stored, and at a later time the memory device can be placed in communication with a processing system 32 to determine from the acquired data the occurrence and general location of a potentially damaging event. In other embodiments, the data acquisition system can be in constant communication with the sensor 24 and the processing system such that the structure 26 is capable of being continuously monitored by the sensor(s) 24 and potentially damaging events may be continually assessed.

Each passive sensor 24 is capable of communicating with the data acquisition system 28 and/or the processing system 32 via wires or wirelessly. For example, each sensor 24 can be capable of utilizing wireless technology, such as radio frequency emissions (e.g., via RFID, broadband, WiFi, Bluetooth®, Zigbee®, etc. communication) or other wireless techniques (e.g., via infrared communication) to communicate with the data acquisition system 28.

During use, a potentially damaging event at or near a passive sensor 24 can be detected by the sensor 34 (e.g., as a stress wave) and translated to an electrical current, which can then be stored as a digital value and/or communicated to the data acquisition system 28. In some embodiments, the time that the event occurred may also be stored. Typically, potentially damaging events can be indicated when the data of one or more sensors 24 varies from determinant values that can be obtained from baseline values (i.e., data acquired at the sensor under controlled conditions with no damaging events taking place) or that can be obtained through numerical or analytical simulations, with the variation typically being more than a predefined percentage or more than a predefined amount (in absolute terms). For example, if a detected event varies from a standard acoustic background level (as measured, e.g., in decibels) by about 10% or more, 15% or more, or 20% or more in some embodiments, a notification can be triggered that a potentially damaging event has occurred at or near that particular sensor.

In some embodiments, the system can gather additional data, such as information relating to the operating environment (e.g., temperature), maintenance (e.g., maintenance schedule or procedures), and/or specific characteristics of the structure (e.g., specifications). In those embodiments in which a sensor includes a data storage component, this component can be reset, i.e., the data erased, after the data is communicated to the data acquisition system, periodically, or at any other desired time.

The automation of data collection for a system can generally include two parts. A first hardware part can utilize an automatic signal switch box and a second software part can correspond to a control program. In an exemplary method of operation, digital control signals are generated by the software and sent to the switch box through a parallel port associated with a processor by way of a standard parallel cable. It should be appreciated, however, by those of ordinary skill in the art that other signal transfer methodologies and apparatus could be used, including, but not limited to, serial ports, infrared ports, USB ports, FireWire (IEEE 1394) ports, and wireless connections including WiFi and Bluetooth® technology. In addition, although reference is made herein to a computer and associated software, the use of such is not a specific requirement of the present subject matter, as other devices including microprocessors, microcontrollers, application specific integrated circuit (ASIC) devices and other known devices may be employed to carry out the recited functions.

Upon recognition and detection of a potentially damaging event at the processing system 32, the particular location of the event within the manufacturing process can be noted and, depending upon the nature of the event and the process, the structure involved can be immediately flagged for further examination or can be flagged for later examination. In some embodiments, detection of a potentially damaging event can also cause specific notifications to be sent.

A monitoring system can optionally include a non-destructive examination device or system for further examination of a structure. Accordingly, following detection of a potentially damaging event by the sensor/data acquisition/ processing system, a structure that may have been affected by the potentially damaging event can be further analyzed by use of, and without limitation to, ultrasonic techniques, magnetic-particle techniques, liquid penetrant techniques, radiographic techniques, eddy-current testing, low coherence interferometry, and so forth, as well as combinations of techniques as is known in the art.

By way of example, an ultrasonic based nondestructive examination system as described in U.S. Patent Application Publication No. 2007/0074573, which is incorporated herein by reference, can be utilized in conjunction with the monitoring system described herein. Briefly, a system can include a chassis in which there exists an array of feeler-carrier devices housing the ultrasonic transducers. The head can be coupled to a displacement system, for example, a machine of the moving-bridge type or of the moving-gantry type. This can provide sufficient degrees of freedom for ensuring coupling with a curved surface. The degrees of freedom can be achieved with rotations or tiltings and vertical movements made by elements of the chassis.

Through utilization of the system, all or part of a structure can be continually monitored for damage and specific information concerning the type, location and intensity of damage due to an ambient event. The improved monitoring can prevent production of damaged goods through detection and examination of potentially damaging events to structures, correlated with the Computer Vision data otherwise obtained in accordance with presently disclosed embodiments.

A monitoring system can include components of a passive SHM system and/or an active SHM system on or in or affixed to a structure that is in contact with a sensor. As otherwise referenced herein, a structure can include additional components in conjunction with the overall structure being monitored (for example, a support component within a bridge structure).

In some embodiments, passive system components can gather additional data, such as information relating to the operating environment (e.g., temperature), maintenance (e.g., maintenance schedule or procedures), and/or specific characteristics of the structure (e.g., specifications). The data storage component can be reset, i.e., the data erased, after the data is communicated to a data acquisition system, periodically, or at any other desired time.

Pattern recognition schemes can be utilized to estimate the location and level of damage from events. For instance, pattern recognition schemes can examine data from a single sensor and/or compare data from multiple sensors to localize a potentially damage event and/or the level or type of damage caused by the event. By development and use of such data analysis schemes as well as through combination of the passive and/or active systems, disclosed systems can provide useful data with relatively few embedded sensors for an entire structure.

In conjunction with a passive sensing component, a composite SHM system may include an active component. The active component of the system can include transducers attached in/on a structure to provide further information in addition to that provided by the passive component of the system. Exemplary passive and/or active SHM system components and methods as may be included in a presently disclosed SHM system have been described, for instance in U.S. Patent Application Publication Nos. 2017/0168021 and 2018/0045688, all commonly owned herewith and all of which are incorporated herein by reference in their entireties and for all purposes.

With reference to active components of a composite SHM system, one or more active transducers may be embedded in a structure. The transducers can be capable of transmitting a signal that can be detected by one or more active sensors embedded in the structure. The sensors are capable of communication with an electronic module for signal transmission/reception, processing and interpretation.

Presently disclosed subject matter focuses on a system to transform connectivity between physical infrastructure and vehicles, which transforms multimodal transportation through connectivity, data analytics, and automation.

Further, presently disclosed subject matter incorporates Computer Vision into a structural health monitoring system, to better address the impacts of vehicular loading on the recorded data and provides for potential control of autonomous vehicles based on real-time conditions and response of physical infrastructure components.

The methodology in part provides: 1) Deployment of an integrated video/SHM system on actual bridges; 2) Correlation of vehicular data (computer vision) with structural health monitoring data; 3) Evaluation of the structural significance of the structural health monitoring data; 4) Performance of transportation network modeling for asset management;

Thus, next steps in presently disclosed methodology encompass correlating vehicular data with SHM data. Video traffic data captured concurrently with SHM data may result in large and unwieldy data sets. Algorithms for automated discrimination between vehicle types will be used so that classifiers for the SHM data can be specified. Such work will benefit from advances in autonomous and assisted driving, which has resulted in mature approaches for detecting pedestrians, bicycles, cars, and larger vehicles. The demands require performance under various lighting conditions, including dawn, dusk and night. Current approaches are based on "deep learning" architectures, which are types of artificial neural networks typically entailing multiple network layers. Continuous video classification differs from image classification on individual images, for which the current standard is the convolutional neural network (CNN). In the continuous case, presently disclosed embodiments can take advantage of correlations between video frames. The current state of the art for video classification is based on the recurrent neural network paradigm (RNN) in conjunction with a CNN. See, for example, Fischer, N. M., et al., "Optimizing a neural network for detection of moving vehicles in video," in Proceedings Volume 10441, Counterterrorism, Crime Fighting, Forensics, and Surveillance Technologies; 104410I (2017) https://doi.org/10.1117/12.2277974; Hu, X., et al., "SINet: A Scale-insensitive Convolutional Neural Network for Fast Vehicle Detection," IEEE Transactions on Intelligent Transportation Systems (TITS), to appear; Donahue, J., et al., "Long-Term Recurrent Convolutional Networks for Visual Recognition and Description," in IEEE Conference on Computer Vision and Pattern Recognition (CVPR), 2015, pp. 2625-2634.

The salient point of the RNN architecture is that it can learn long-term dependencies such as the presence of a moving vehicle in the field of view. Some presently disclosed embodiments may make use of a combination of such two architectures. For example, the CNN may be used to detect spatial features while the RNN is used for temporal features, allowing some embodiments to identify moving vehicles and which lanes they occupy.

Further presently disclosed methodology steps include evaluating structural significance of SHM data. Previously known baseline information may be considered. For example, prior structural health monitoring investigations may have been conducted focused on evaluation of the structural condition of civil infrastructure for varied damage mechanisms including induced loading, internal corrosion of reinforcement, fatigue crack growth in bridge steel, shear crack initiation in prestressed concrete bridges, and others. See, for example, Appalla, A., et al., "Assessing Corrosion Damage in Post-Tensioned Concrete Structures Using Acoustic Emission," (2016), J. of Mats. in Civil Eng., Vol. 28 (2); and Anay, R., et al., "On-Site Acoustic Emission Monitoring for Assessment of a Prestressed Concrete Double-Tee Beam Bridge without Plans," (2017), J. of Perf. of Constr. Fac., Vol. 30 (4).

The presently disclosed methodology determines correlation of the load induced bridge behavior as understood through Computer Vision and other data inputs (strain, crack mouth opening displacement, acoustic emission) and the related use of algorithms to assess the structural condition of the monitored bridge component(s).

Still further presently disclosed methodology encompasses performing modeling for asset management. Knowledge gained in preceding steps will improve the understanding of transportation networks in relation to asset management. Generated data sets will be used to understand vehicle types, inter-vehicle distances, and loads. Such knowledge will enable the use of such data as an input to minimize the load impact of platoons to the infrastructure with respect to vehicle mixtures and distances in Cooperative Adaptive Cruise Control (CACC). The data may also be used to determine a conceptual framework for roadside equipment (RSE) to regulate platooning behavior (i.e., a group of vehicles that can travel very closely together and safely at high speed) for both load impact and vulnerability minimization by serving as a redundant sensor or observer node (in CACC).

Practice of the presently disclosed subject matter results in significant improvement in capabilities offered through structural health monitoring. The presently disclosed subject matter comprising an integrated computer vision/SHM system provides previously unavailable data on vehicular loading and its effect on structural response and degradation, with the potential to transmit routing and vehicle-spacing algorithms and/or instructions to autonomous vehicles.

This written description uses examples to disclose the presently disclosed subject matter, including the best mode, and also to enable any person skilled in the art to practice the presently disclosed subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for structural health monitoring of a structure, comprising:
   acquiring sensor data from at least one acoustic emission sensor associated with a structure to be monitored, wherein the structure to be monitored is a bridge;
   acquiring video data associated with such structure, wherein the video data comprises images of vehicle loading on the bridge; and
   correlating such sensor data and such video data for identifying a potentially damaging event to such structure;
   wherein correlating such sensor data and such video data comprises associating acoustic emissions with specific vehicles crossing the bridge;
   the sensor is an acoustic emission sensor for sensing acoustics from an ambient event, and the potentially damaging event is correlated with acquiring a predetermined acoustic signature;
   the sensor is a single sensor in an organized array comprising multiple sensors, the method comprising acquiring data from the multiple sensors; and
   wherein the multiple sensors of the array are in wired or wireless communication with one another.

2. The method of claim 1, wherein the structure to be monitored is a support component of a bridge, and the sensor is one of attached to, embedded in, or associated with the structure.

3. The method of claim 1, wherein the video data includes at least one of type of vehicle, a vehicle specific location on the bridge, and distance from other vehicles on the bridge.

4. The method of claim 1, further including correlating the sensor data and video data for a predetermined sample period of time.

5. The method of claim 4, wherein said predetermined sample period of time comprises a preset number of hours.

6. The method of claim 1, wherein acquiring video data comprises taking and storing a plurality of relatively high-definition images.

7. The method of claim 6, wherein acquiring video data comprises taking and storing a plurality of relatively high-definition images for a minimum of 30 frames per second.

8. The method of claim 1, further including at least one sensor which senses at least one of acoustic emission, strain, temperature, and crack mouth opening displacement.

9. The method of claim 1, wherein the sensor is one of a passive sensor and an active sensor.

10. The method of claim 1, wherein the sensor detects stress waves in an associated structure.

11. The method of claim 1, further including at least one of an acoustic emission, piezoelectric, through-transmission, shear-wave, resonance, or mechanical impedance sensor.

12. A system for structural health monitoring of a structure, comprising:
   at least one sensor associated with a structure to be monitored and acquiring sensor data therefrom;
   a computerized vision system for acquiring video data associated with such structure;
   a data acquisition system in communication with the sensor for receiving sensor data therefrom, and in communication with the computerized vision system for receiving video data therefrom; and
   a processing system in communication with the data acquisition system and configured for correlating such sensor data and such video data for identifying a potentially damaging event to such structure by associating acoustic emissions with specific vehicles crossing the bridge;
   wherein the structure to be monitored is a bridge; said sensor is an acoustic emission sensor, which is one of attached to, embedded in, or associated with the structure to be monitored, for sensing acoustics from an ambient event, and the potentially damaging event is correlated with acquiring a predetermined acoustic signature;
   said sensor is a single sensor in an organized array comprising multiple sensors, for acquisition of data from the multiple sensors, with said multiple sensors of the array in wired or wireless communication with one another; and said video data comprises images of vehicle loading on the bridge.

13. The system of claim 12, wherein: said video data includes at least one of type of vehicle, a vehicle specific location on the bridge, and distance from other vehicles on the bridge; and said processing system correlating of such sensor data and such video data comprises associating acoustic emissions with specific vehicles crossing the bridge.

14. The system of claim 13, wherein: said video data comprises a plurality of relatively high-definition images; and said processing system correlating includes correlating said sensor data and video data for a predetermined sample period of time.

15. The system of claim 12, wherein: the structure to be monitored comprises a support component of a bridge, a dam, and a power generation station; and said system further includes at least one sensor which senses at least one of acoustic emission, strain, temperature, and crack mouth opening displacement of such component.

16. The system of claim 12, wherein said sensor detects stress waves in an associated structure.

17. The system of claim 12, wherein: said sensor comprises an organized array of multiple sensors comprising at least one of an acoustic emission, piezoelectric, through-transmission, shear-wave, resonance, or mechanical impedance sensors; and said data acquisition system is in communication with said array of multiple sensors for receiving sensor data therefrom.

* * * * *